(12) United States Patent
Zhou

(10) Patent No.: US 11,200,576 B2
(45) Date of Patent: Dec. 14, 2021

(54) METHOD AND SYSTEM FOR SELF-CHECKOUT

(71) Applicant: ADVANCED NEW TECHNOLOGIES CO., LTD., Grand Cayman (KY)

(72) Inventor: Liang Zhou, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 17/181,419

(22) Filed: Feb. 22, 2021

(65) Prior Publication Data

US 2021/0182864 A1    Jun. 17, 2021

Related U.S. Application Data

(63) Continuation of application No. PCT/CN2019/096742, filed on Jul. 19, 2019.

(30) Foreign Application Priority Data

Oct. 10, 2018 (CN) .......................... 201811176913.3

(51) Int. Cl.
*G06Q 20/40* (2012.01)
*G06Q 20/10* (2012.01)
*G06Q 20/32* (2012.01)

(52) U.S. Cl.
CPC ..... *G06Q 20/40145* (2013.01); *G06Q 20/102* (2013.01); *G06Q 20/3224* (2013.01)

(58) Field of Classification Search
CPC ............................................... G06Q 20/40145

USPC ......................................................... 705/44
See application file for complete search history.

(56) References Cited

U.S. PATENT DOCUMENTS

| | | | |
|---|---|---|---|
| 7,272,570 | B2 | 9/2007 | Sadler |
| 7,980,378 | B2 | 7/2011 | Jones et al. |
| 8,403,215 | B2 | 3/2013 | Aihara et al. |
| 8,438,066 | B1 | 5/2013 | Yuen et al. |
| 8,473,363 | B1 | 6/2013 | Oakes, III |
| 8,577,729 | B2 | 11/2013 | Iizaka et al. |

(Continued)

FOREIGN PATENT DOCUMENTS

| | | |
|---|---|---|
| CN | 104424752 A | 3/2015 |
| CN | 105631673 A | 6/2016 |

(Continued)

OTHER PUBLICATIONS

Search Report for Taiwanese Application No. 108125824 dated May 5, 2020.

(Continued)

*Primary Examiner* — Alexander G Kalinowski
*Assistant Examiner* — Paul R Kloberg

(57) ABSTRACT

The specification describes methods and systems for payment processing. An example method comprises: receiving a product settlement request from a settlement user; acquiring and storing biometric feature information of the settlement user; receiving product information from the settlement user; obtaining a payment account of the settlement user according to the stored biometric feature information; and deducting, from the payment account, a consumption amount determined based on the product information.

20 Claims, 7 Drawing Sheets

(56) References Cited

U.S. PATENT DOCUMENTS

| | | |
|---|---|---|
| 9,519,901 B1 | 12/2016 | Dorogusker |
| 9,536,236 B2 | 1/2017 | Hay |
| 9,715,672 B2 | 7/2017 | Daily et al. |
| 9,799,023 B2 | 10/2017 | Jacobs |
| 2004/0133477 A1 | 7/2004 | Morris et al. |
| 2014/0222603 A1 | 8/2014 | Hay |
| 2015/0066765 A1* | 3/2015 | Banks ................... G06Q 20/363 705/44 |
| 2015/0193763 A1 | 7/2015 | Cyr et al. |
| 2015/0235197 A1 | 8/2015 | Edwards |
| 2015/0278812 A1* | 10/2015 | Partington ........... G06Q 20/102 705/44 |
| 2016/0125413 A1* | 5/2016 | Lin .................... G06Q 20/3224 705/44 |
| 2016/0253665 A1* | 9/2016 | Van Os ................ G06Q 20/327 705/44 |
| 2018/0089688 A1* | 3/2018 | Kohli ............... G06Q 20/40145 705/44 |
| 2020/0134633 A1 | 4/2020 | Zhou et al. |

FOREIGN PATENT DOCUMENTS

| | | |
|---|---|---|
| CN | 105898418 A | 8/2016 |
| CN | 103985036 B | 5/2017 |
| CN | 106875592 A | 6/2017 |
| CN | 106887094 A | 6/2017 |
| CN | 107464116 A | 12/2017 |
| CN | 107507003 A | 12/2017 |
| CN | 108235771 A | 6/2018 |
| CN | 108280649 A | 7/2018 |
| CN | 109508990 A | 3/2019 |
| TW | M519775 U | 4/2016 |

OTHER PUBLICATIONS

Jiabi Chen, "Rely on the face to eat? KFC and Alipay first launch "Pay with Face", the payment process takes less than 10 seconds", https://www.hk01.com/%E8%B2%A1%E7%B6%93%E5%BF%AB%E8%A8%8A/116277/%E9%9D%A0%E8%87%89%E5%90%83%E9%A3%AF-kfc%E8%88%87%E6%94%AF%E4%BB%98%E5%AF%B6%E9%A6%96%E6%8E%A8-%E5%88%B7%E8%87%89%E6%94%AF%E4%BB%98-%E4%BB%98%E6%AC%BE%E9%81%8E%E7%A8%8B%E4%B8%8D%E7%94%A810%E7%A7%92, Sep. 1, 2017.

Written Opinion and International Search Report for PCT Application No. PCT/CN2019/096742 dated Oct. 8, 2019.

First Search for Chinese Application No. 201811176913.3 dated Jan. 7, 2020.

Supplementary Search for Chinese Application No. 201811176913.3 dated May 6, 2020.

Supplementary Search for Chinese Application No. 201811176913.3 dated Aug. 17, 2020.

International Preliminary Report on Patentability Chapter I for PCT Application No. PCT/CN2019/096742 dated Apr. 22, 2021.

\* cited by examiner

METHOD AND SYSTEM FOR SELF-CHECKOUT

CROSS REFERENCE TO RELATED APPLICATIONS

The application is a continuation application of International Patent Application No. PCT/CN2019/096742, filed on Jul. 19, 2019, which claims priority to Chinese Patent Application No. 201811176913.3, filed on Oct. 10, 2018. The entire content of the above referenced applications is incorporated herein by reference.

TECHNICAL FIELD

Embodiments of this specification relate to the field of Internet technologies, and in particular, to a payment processing method for a self-service checkout apparatus.

BACKGROUND

As the level of consumption gradually increases, people have increasingly high requirements for consumption environments, and self-service checkout modes have emerged. The self-service checkout modes can improve checkout efficiency, reduce the waiting time of consumers, and reduce labor and management costs of sellers. The self-service checkout has practically disrupted the retail model of conventional supermarkets and has a positive significance for creating a new retail model in the Internet era.

SUMMARY

Embodiments of this specification provide a payment processing method for a self-service checkout apparatus.

According to a first aspect, an embodiment of this specification provides a payment processing method, including: receiving, by a computer device, a product settlement request from a settlement user, wherein the product settlement request indicates the settlement user is ready to input product information to the computer device for settlement; acquiring, by the computer device, biometric feature information of the settlement user and storing the biometric feature information in a buffer of the computer device; receiving, by the computer device, a payment request indicating that the settlement user is ready to make a payment; retrieving, by the computer device, the biometric feature information from the buffer of the computer device; obtaining, by the computer device, a payment account of the settlement user according to the biometric feature information; and deducting, by the computer device from the payment account, a consumption amount determined based on the product information.

In some embodiments, the acquiring biometric feature information of the settlement user comprises: triggering an image acquisition apparatus (such as a camera) to perform image acquisition on a settlement venue; obtaining, through the image acquisition apparatus, a settlement operation image of the settlement venue; detecting whether there is the biometric feature information in the settlement operation image; and in response to that the biometric feature information is detected in the settlement operation image, extracting the biometric feature information.

In some embodiments, the acquiring biometric feature information of the settlement user comprises: triggering an image acquisition apparatus to perform image acquisition on a settlement venue through a plurality of points in time, wherein the plurality of points in time are after receiving the product settlement request and before receiving the payment request; for each settlement operation image collected at one of the plurality of points in time, detecting whether there is observed biometric feature information in the each settlement operation image; and comparing the observed biometric feature information with the biometric feature information in the buffer; and replacing the biometric feature information in the buffer with the observed biometric feature information if the observed biometric feature information does not match the biometric feature information in the buffer.

In some embodiments, the method may further comprise displaying, by the computer device, prompt information to the settlement user, wherein the prompt information displays the biometric feature information stored in the buffer.

In some embodiments, the acquiring biometric feature information of the settlement user comprises: triggering an image acquisition apparatus to perform image acquisition on a settlement venue; obtaining, through the image acquisition apparatus, a settlement operation image of the settlement venue, wherein the settlement operation image comprises a plurality of users; detecting respective distances from the plurality of users to the computer device; and determining one of the plurality of users with a shortest distance to the computer device as the settlement user; and extracting the biometric feature information of the settlement user from the settlement operation image.

In some embodiments, before the obtaining a payment account of the settlement user according to the biometric feature information, the method further comprises: displaying a payment confirmation interface to the settlement user; receiving payment confirmation information from the payment confirmation interface that confirms that the biometric feature information is used for making the payment; and performing the obtaining a payment account of the settlement user according to the biometric feature information.

In some embodiments, the obtaining a payment account of the settlement user according to the biometric feature information comprises: comparing the biometric feature information retrieved from the buffer with a plurality of pre-stored biometric samples; identifying one of the plurality of biometric samples that matches the biometric feature information; and determining a payment account associated with the identified biometric sample as the payment account of the settlement user.

In some embodiments, the biometric feature information further comprises first verification information, and before the comparing biometric feature information with the plurality of pre-stored biometric samples, the method further comprises: displaying a verification information input interface to the settlement user; receiving second verification information from the verification information input interface; comparing the first verification information with the second verification information; and when the first and second verification information are matched, performing the comparing biometric feature information with the plurality of pre-stored biometric samples.

In some embodiments, the acquiring biometric feature information of the settlement user comprises: triggering an image acquisition apparatus to perform image acquisition on a settlement venue; obtaining, through the image acquisition apparatus, a settlement operation image of the settlement venue, wherein the settlement operation image comprises a plurality of users; detecting respective positions of the plurality of users in the settlement venue; and determining one of the plurality of users in a middle position in the settlement venue as the settlement user; and extracting biometric feature information of the settlement user from the settlement operation image.

According to another aspect, a non-transitory computer-readable storage media is described. The non-transitory computer-readable storage media stores instructions executable by one or more processors. Execution of the instructions causes the one or more processors to perform operations comprising: receiving a product settlement request from a settlement user, wherein the product settlement request indicates the settlement user is ready to input product information for settlement; acquiring biometric feature information of the settlement user and storing the biometric feature information in a buffer; receiving a payment request indicating that the settlement user is ready to make a payment; retrieving the biometric feature information from the buffer; obtaining a payment account of the settlement user according to the biometric feature information; and deducting, from the payment account, a consumption amount determined based on the product information.

According to yet another aspect, a system comprising one or more processors and one or more non-transitory computer-readable memories is described. The non-transitory computer-readable memories is coupled to the one or more processors and configured with instructions executable by the one or more processors to cause the system to perform operations comprising: receiving a product settlement request from a settlement user, wherein the product settlement request indicates the settlement user is ready to input product information for settlement; acquiring biometric feature information of the settlement user and storing the biometric feature information in a buffer; receiving a payment request indicating that the settlement user is ready to make a payment; retrieving the biometric feature information from the buffer; obtaining a payment account of the settlement user according to the biometric feature information; and deducting, from the payment account, a consumption amount determined based on the product information.

The embodiments of this specification offer various technical improvements. In some embodiments, biometric feature information of a settlement user is acquired when a product settlement request is received. When a payment request is received, it is determined whether the biometric feature information is successfully acquired. That is, the biometric feature information of the settlement user is acquired as the settlement user enters product information. Instead of acquiring the biometric feature information of the settlement user after the settlement user finishes entering the product information, the biometric feature information of the settlement user is acquired at the same time when the settlement user enters the product information, thereby improving the processing speed of product settlement.

DETAILED DESCRIPTION

To better understand the foregoing technical solutions, the technical solutions of the embodiments of this specification are described in detail below through the accompanying drawings and specific embodiments. The embodiments of this specification and the specific features in the embodiments are a detailed description of the technical solutions of the embodiments of this specification instead of limitations on the technical solution of this specification. The embodiments of this specification and the technical features in the embodiments can be combined with each other in the case of no conflict.

Figure 1:
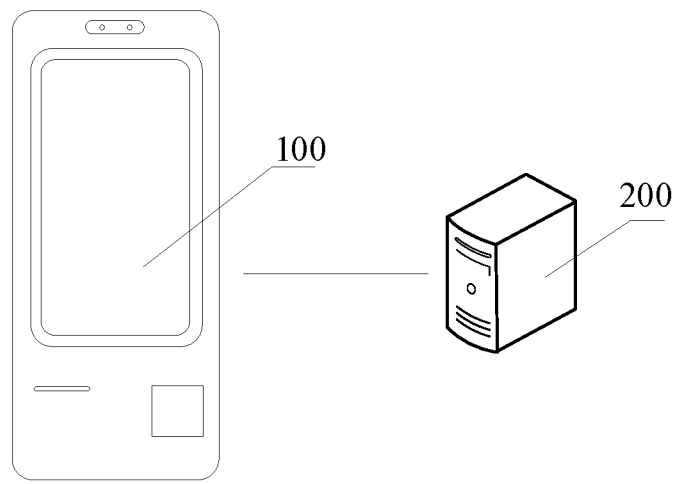
FIG. 1 is a schematic diagram of an application scenario of payment processing, according to an embodiment of this specification.

FIG. 1 is a schematic diagram of an application scenario of payment processing, according to an embodiment of this specification. A self-service checkout device 100 is located on a user side, and communicates with a server 200 on a network side. The self-service checkout device 100 may refer to a computer device, such as a computer, a display connected to a server or a cloud service, a smart device, a point of sale device, a camera, another suitable terminal device, or any combination thereof. The self-service checkout device 100 may be set up in a shopping area such as a supermarket, and is configured to: acquire product information entered by a settlement user; obtain, according to the product information entered by the settlement user, a consumption amount that the settlement user needs to pay; and send the consumption amount that the settlement user needs to pay to the server 200. The server 200 performs deduction processing on the payment account of the settlement user.

Figure 2:
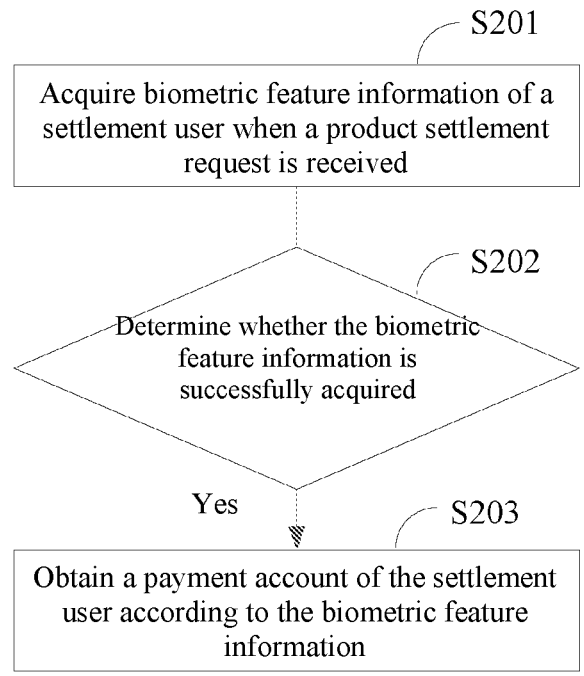
FIG. 2 is a flowchart of a payment processing method, according to an embodiment of this specification.

According to a first aspect, an embodiment of this specification provides a payment processing method. FIG. 2 is a flowchart of the payment processing method. The payment processing method includes steps S201 to S203.

Step S201: Acquiring biometric feature information of a settlement user when a product settlement request is received. Each user has unique biometric features. Therefore, different users can be distinguished by means of biometric feature recognition technologies. Biometric features are inherent attributes of each user, and the user does not need to carry an object such as a bank card or a mobile phone when making a payment that requires the confirmation of user identity by using the biometric feature recognition technologies. Therefore, payment can be more convenient. In this embodiment of this specification, the biometric feature information such as facial information, iris information or skeleton information may be the biometric feature information that can be acquired without the contact or perception of the settlement user, to reduce the operation and understanding costs of the settlement user without the cooperation and active interaction of the settlement user.

Figure 3:
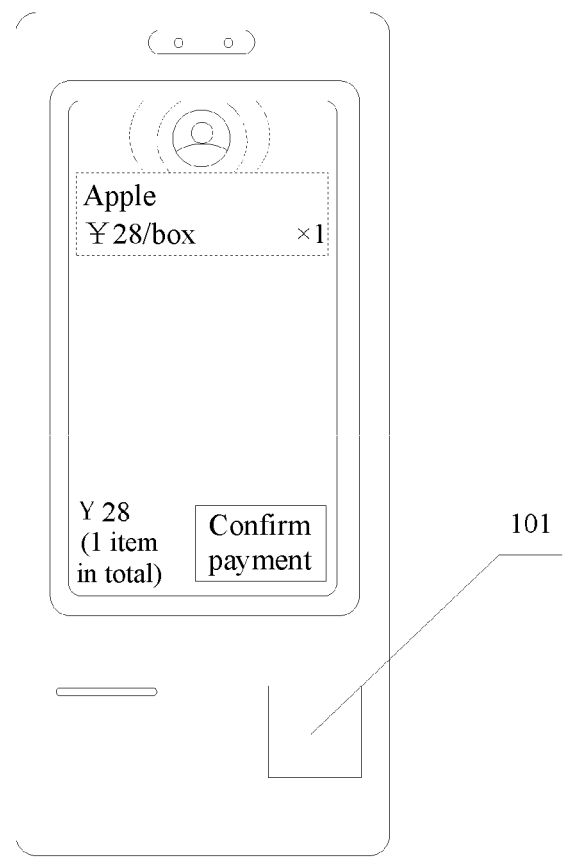
FIG. 3 is a schematic diagram of a product settlement request inputted by a settlement user, according to an embodiment of this specification.
Figure 4:
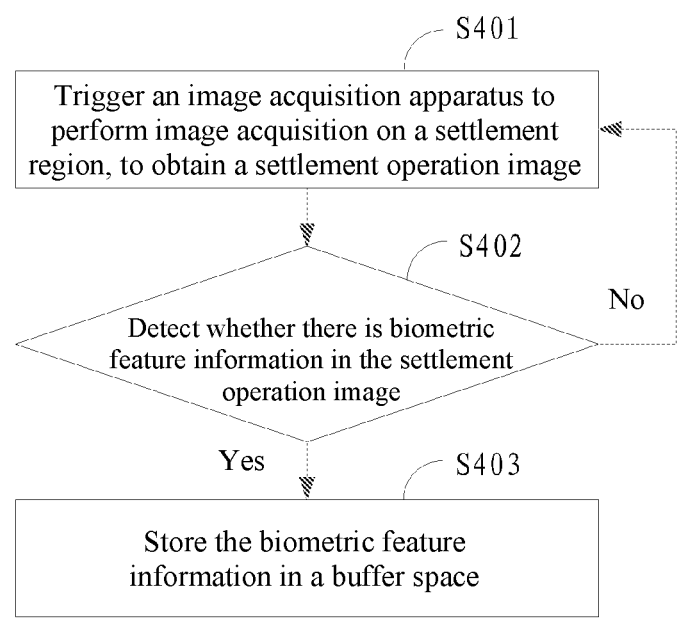
FIG. 4 is a flowchart of acquiring biometric feature information, according to an embodiment of this specification.

The settlement user is the user performing the settlement operation on the self-service checkout device 100. After a product is purchased, the settlement user may request to settle the payment of the product purchased by the settlement user, that is, request the self-service checkout device 100 to acquire product information. The product settlement request may be an operation of inputting the ID of the first product by the settlement user by using an input apparatus such as a key or a touchscreen provided by the self-service checkout device 100, or may be an operation of scanning the barcode of the first product by the settlement user by using a barcode scanner provided by the self-service checkout device 100, or may be another operation of triggering the self-service checkout device 100 to acquire the product information. This is not limited in this embodiment of this application. As shown in FIG. 3, when the product settlement request is the operation of scanning the barcode of the first product by the settlement user by using the barcode scanner provided by the self-service checkout device 100, the barcode scanner may be built in the self-service checkout device 100, and the settlement user only needs to place the barcode of the product at a light source exit 101 of the barcode scanner. FIG. 4 is a flowchart of acquiring the biometric feature information, including steps S401 to S403.

Step S401: Triggering an image acquisition apparatus to perform image acquisition on a settlement region (also called venue), to obtain a settlement operation image.

The Image acquisition apparatus may be a 3D camera apparatus, e.g. a structured light camera, a binocular camera, or a TOF (Time of Flight) camera. The settlement region may be determined according to a mounting position of the image acquisition apparatus provided that the settlement user performing the settlement operation is located in an acquisition range of the image acquisition apparatus. The image acquisition apparatus is turned on to perform the image acquisition when the product settlement request is received. The performing the image acquisition on the settlement region may be photographing the settlement region to obtain one or more settlement operation images, or may be shooting the settlement region to obtain a plurality of frames of settlement operation image. This is not limited in this specification.

Step S402: Detecting whether there is the biometric feature information in the settlement operation image. After the settlement operation image is obtained, an image detection algorithm is used to detect whether there is biometric feature information in the settlement operation image. Different image detection algorithms are used according to different biometric feature information. An example in which the biometric feature information is the facial information is used. A detection method such as a silent liveness detection method, a Fourier spectrum analysis method, an optical flow estimation method may be used for detection. Further, if there are a plurality of users in the settlement operation image and distances between the users and the self-service checkout device 100 are different, a user closest (with the shortest distance) to the self-service checkout device 100 may be determined as the settlement user according to the distances between the users and the self-service checkout device 100. If there is a plurality of users in the settlement operation image, and the distances between the users and the self-service checkout device 100 are the same, a user located right in the middle of the settlement operation image may be determined as the settlement user. In some embodiments, the distances between the users and the self-service checkout device 100 may be determined using image processing techniques based on a sensor size of a sensor associated with the self-service checkout device 100, a focal length of the lens of the sensor, an image height, a sensor height, estimated actual heights of the users, or any combination thereof.

If there is the biometric feature information in the settlement operation image, step S403 is performed to store the biometric feature information in a buffer space. Otherwise, step S401 is performed again. That is, step S401 and step S402 are performed repeatedly until it is detected that there is the biometric feature information in the settlement operation image or a payment request is received.

The example in which the biometric feature information is the facial information is still used. The biometric feature information is stored in the buffer space. That is, information such as a facial position, a size, and a gesture of the settlement user is extracted from the settlement operation image, and the extracted information is stored in the buffer space. The biometric feature information is stored in the buffer space, so that the biometric feature information can be prevented from being lost when the settlement user lowers the head to make a settlement.

Figure 5:
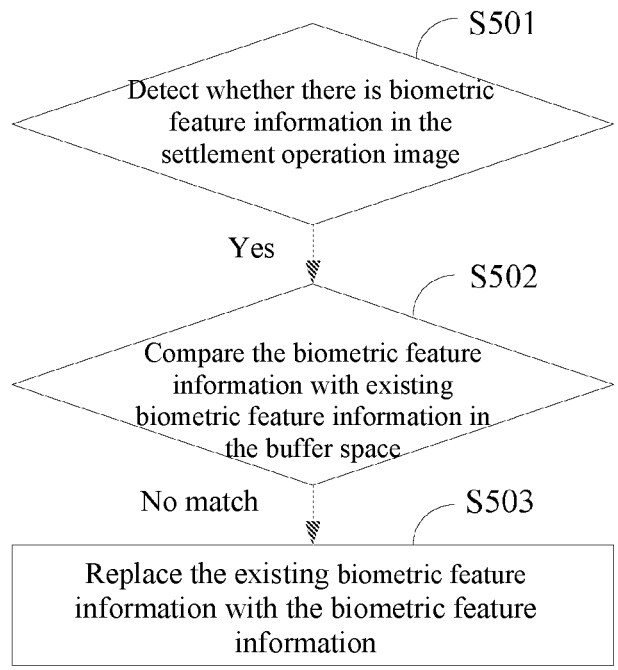
FIG. 5 is a flowchart of performing detection processing on a settlement operation image acquired each time, according to an embodiment of this specification.

In the period of entering the product information by the settlement user, the settlement user may suddenly leave or another user may take the place of the settlement user to perform the settlement operation. Therefore, in some embodiments, the acquiring the biometric feature information includes: triggering the image acquisition apparatus to continuously perform the image acquisition on the settlement region, and performing detection processing on a settlement operation image acquired each time. Here, the "continuously perform the image acquisition" means the image acquisition on the settlement region spans across a plurality of points in time. For each settlement operation image collected at one of the plurality of points in time, a detection process may be performed to detect whether there is observed biometric feature information in the each settlement operation image. If the observed biometric feature information does not match the existing biometric feature information stored in the buffer place of the computer device, the existing biometric feature information may be replaced by the observed biometric feature information. The continuously performing the image acquisition on the settlement region starts from the movement when the product settlement request is received to the moment when the payment request is received. That is, the image acquisition is continuously performed on the settlement region during the period of entering the product information by the settlement user. Compared with the foregoing example, the settlement operation image acquired each time may be one or more settlement operation images obtained by photographing the settlement region, or may be a plurality of frames of settlement operation image obtained by shooting the settlement region. This is not limited in this embodiment of this specification. FIG. 5 is a flowchart of performing detection processing on the settlement operation image acquired each time, including steps S501 and S503.

Step S501: Detecting whether there is the biometric feature information in the settlement operation image. For this step, reference may be made to the description of step S402 in the foregoing embodiment. Details are not described herein again.

If there is the biometric feature information in the settlement operation image, step S502 of comparing the biometric feature information with existing information in the buffer space is performed.

The biometric feature information is compared with the existing information in the buffer space to determine whether the biometric feature information matches the existing information. If a similarity between the biometric feature information and the existing information is greater than a preset percentage, it indicates that the biometric feature information matches the existing information, the settlement user has not left and no other user takes the place of the settlement user to perform a settlement operation. If the similarity between the biometric feature information and the existing information is not greater than a preset percentage, it indicates that the biometric feature information does not match the existing information, and the settlement user has left or another user has taken the place of the settlement user to perform the settlement operation. When the biometric feature information is detected for the first time, the buffer space is empty, and a comparison result is that no match is found.

If the biometric feature information does not match the existing information, step S503 of replacing the existing information with the biometric feature information is performed. That is, after it is detected that another user has taken the place of the settlement user to perform the settlement operation, the information stored in the buffer space is updated. Image acquisition is continuously performed on the settlement region and information comparison is performed, so that it can be ensured that the biometric feature information stored in the buffer space is biometric feature information of the current settlement user, thereby preventing an error from occurring in an eventually obtained payment account because another user takes the place of the settlement user in the middle to perform the settlement operation.

Figure 6:
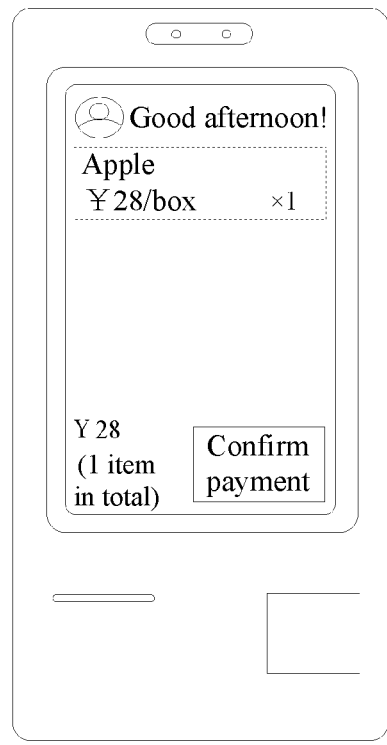
FIG. 6 is a schematic diagram of displaying prompt information by a self-service checkout device, according to an embodiment of this specification.

In some embodiments, prompt information may be displayed to the settlement user during the storage of the biometric feature information in the buffer space. For example, as shown in FIG. 6, the prompt information may be used for prompting acquired biometric feature information.

Figure 7:
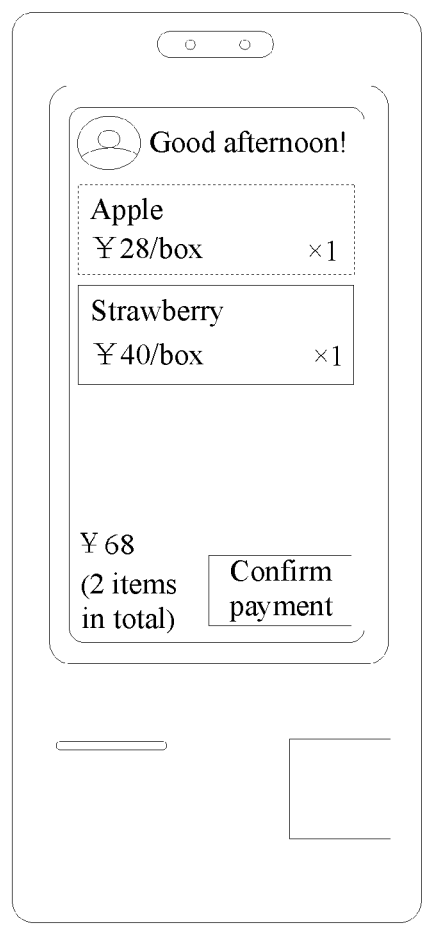
FIG. 7 is a schematic diagram of a payment request inputted by a settlement user, according to an embodiment of this specification.

Step S202: When a payment request is received, determining whether the biometric feature information is successfully acquired. After entering all the product information, the settlement user sends a payment request to the self-service checkout device 100. The payment request may be an operation of confirming a payment by the settlement user by using an input apparatus such as a key or a touch screen provided by the self-service checkout device 100, as shown in FIG. 7. When a payment request is received, the acquiring the biometric feature information is stopped, and it is determined whether the biometric feature information is successfully acquired. According to the procedure of acquiring the biometric feature information shown in FIG. 4 or FIG. 5, the biometric feature information is stored in the buffer space when the biometric feature information is successfully acquired. Therefore, it is determined whether the biometric feature information is successfully acquired, so that it can be detected whether the biometric feature information is stored in the buffer space. If the biometric feature information is stored in the buffer space, determining that the biometric feature information is successfully acquired.

If the biometric feature information is successfully acquired, step S203 of obtaining a payment account of the settlement user according to the biometric feature information is performed.

Figure 8:
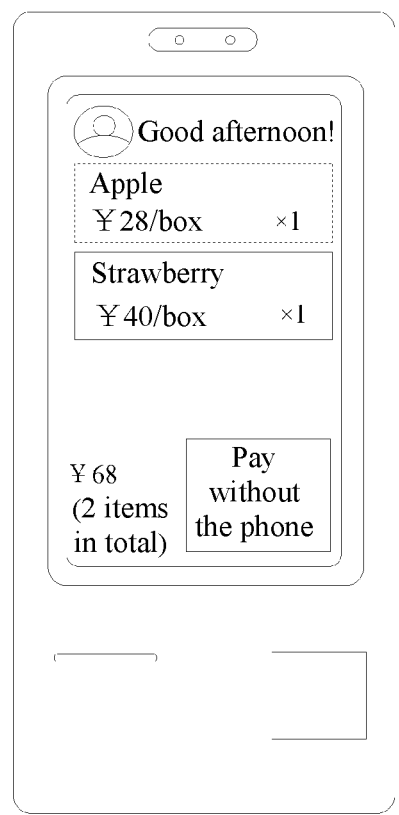
FIG. 8 is a schematic diagram of displaying a payment confirmation interface by a self-service checkout device, according to an embodiment of this specification.

In some embodiments, before step S203 is performed, the method further includes: displaying a payment confirmation interface to the settlement user; and when payment confirmation information inputted by the settlement user is received, performing the obtaining a payment account of the settlement user according to the biometric feature information. The payment confirmation interface is displayed to the settlement user, the settlement user can determine whether a to-be-paid consumption amount is correct and confirm a payment mode of whether to use the biometric feature information for payment. The payment confirmation information may be generated by the settlement user by using an input apparatus such as a key or a touch screen provided by the self-service checkout device 100, as shown in FIG. 8.

When the payment request or the payment confirmation information is received, to-be-compared biometric feature information is compared with a plurality of pre-stored biometric feature samples, to obtain a sample matching the to-be-compared biometric feature information. The to-be-compared information includes the biometric feature information. A payment account associated with the sample is determined as the payment account of the settlement user. Each piece of samples is correspondingly associated with a payment account of a user. When each user creates the user's payment account or uses the user's payment account, the user may enter the user's biometric feature information, that is, the sample biometric feature information, and associatively store the information and the user's payment account. The to-be-compared information is compared with the plurality of biometric feature samples. That is, the biometric feature information is compared with each piece of sample biometric feature information. After the payment account of the settlement user is obtained, a consumption amount is obtained according to a product settlement system, and deduction processing may be performed on the payment account of the settlement user. Because each product has a unique barcode and each barcode corresponds to product information of the product, the product settlement system may obtain the consumption amount according to the product information entered by the settlement user. The product settlement system may be implemented by using existing technologies. Detail are not described herein again.

In some embodiments, the plurality of biometric feature samples and the payment account associated with each sample may be stored in the server 200. Before the to-be-compared information is compared with the plurality of biometric feature samples, the method further includes: sending the to-be-compared information to the server 200. The to-be-compared information is then compared with the plurality of biometric feature samples on the server 200. In some embodiments, the plurality of biometric feature samples and the payment account associated with each biometric feature sample may be alternatively stored locally, that is, stored in the self-service checkout device 100. After the payment account associated with a biometric feature sample is determined as the payment account of the settlement user, the method further includes: sending the payment account of the settlement user to a payment platform. That is, the to-be-compared information is compared with the plurality of biometric feature samples in the self-service checkout device 100.

When the plurality of biometric feature samples and the payment account associated with each sample are stored locally, each user who has not entered biometric feature information may be requested to actively enter the biometric feature information when the user uses the self-service checkout device 100, and associatively store the biometric feature information entered by the user and the payment account inputted by the user. Alternatively, when it is determined that the biometric feature information is successfully acquired, but sample matching the to-be-compared information is not found locally, the settlement user may be prompted to input the payment account and associatively store the payment account and the biometric feature information, so that the settlement user, when making a settlement next time, can locally obtain the biometric feature sample information matching the to-be-compared information.

Figure 9:
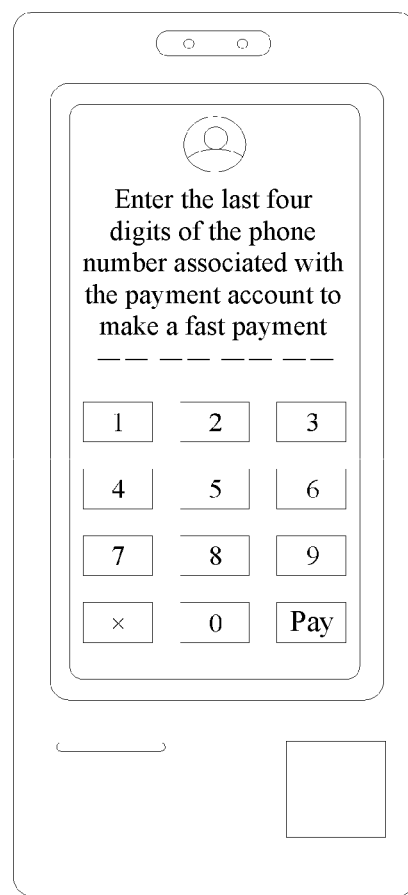
FIG. 9 is a schematic diagram of displaying a verification information input interface by a self-service checkout device, according to an embodiment of this specification.

In some embodiments, the to-be-compared information further includes first verification information. Before the to-be-compared information is compared with the plurality of pre-stored biometric feature samples, the method further includes: displaying a verification information input interface to the settlement user; receiving second verification information from the verification information input interface; comparing the first verification information with the second verification information; and when the first and second verification information are matched, performing the comparing biometric feature information with the plurality of pre-stored biometric samples. Correspondingly, when each user creates the user's payment account or uses the user's payment account, the user may further enter the user's first verification information, and associatively store the first verification information and the user's payment account. The first verification information may be a mobile phone number of the settlement user or several digits (for example, the last four digits) of the mobile phone number. The verification information input interface is shown in FIG. 9. Double verification by using the first verification information and the biometric feature information may effectively improve the security of payments.

Figure 10:
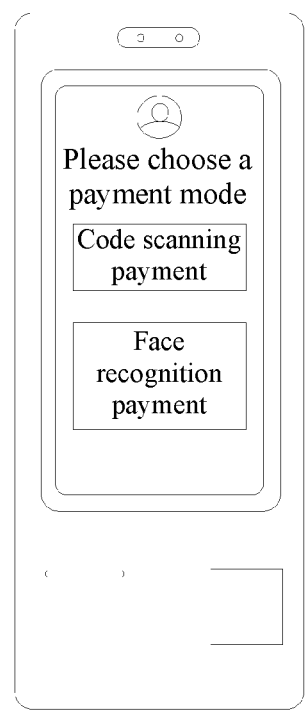
FIG. 10 is a schematic diagram of displaying a payment mode selection interface by a self-service checkout device, according to an embodiment of this specification.

In some embodiments, after it is determined whether the biometric feature information is successfully acquired, the method further includes: displaying a payment mode selection interface to the settlement user if the biometric feature information fails to be acquired; and when the payment mode selected by the settlement user is received, obtaining the payment account of the settlement user according to a payment mode selected by the settlement user. The payment mode selection interface is shown in FIG. 10. The payment mode includes, but is not limited to code scanning payment, facial recognition payment, and the like. After the settlement user selects any payment mode displayed on the payment mode selection interface, corresponding payment processing is performed according to the payment mode selected by the settlement user. For example, if the payment mode selected by the settlement user is code scanning payment, a two-dimensional code corresponding to the settlement may be displayed to the settlement user. The settlement user scans the two-dimensional code by using an intelligent terminal installed with an application program of a payment platform to complete payment. If the payment mode selected by the settlement user is a facial recognition payment, a facial feature acquisition processing interface may be displayed to the settlement user. The facial feature acquisition processing interface prompts the settlement user to face an image acquisition apparatus. The image acquisition apparatus acquires a facial feature of the settlement user, and sends the facial feature of the settlement user to a corresponding payment platform to complete payment. The obtaining of the payment account of the settlement user according to a payment mode selected by the settlement user is implemented in an existing manner. Details are not described herein again.

In some embodiments, the biometric feature information is acquired as the settlement user enters product information. That is, instead of acquiring the biometric feature information of the settlement user after the settlement user finishes entering the product information, the biometric feature information of the settlement user is acquired at the same time when the settlement user enters the product information, thereby improving a processing speed of product settlement.

According to a second aspect, an embodiment of this specification provides a payment processing apparatus based on the same inventive concept, including: an acquisition module, configured to acquire biometric feature information of a settlement user when a product settlement request is received; a determining module, configured to: when a payment request is received, determine whether the biometric feature information is successfully acquired; and a first obtaining module, configured to obtain a payment account of the settlement user according to the biometric feature information if the biometric feature information is successfully acquired.

In some embodiments, the acquisition module includes: an image acquisition trigger unit, configured to trigger an image acquisition apparatus to perform image acquisition on a settlement region, to obtain a settlement operation image; a first detection unit, configured to detect whether there is the biometric feature information in the settlement operation image; and a storage unit, configured to store the biometric feature information in a buffer space if there is the biometric feature information in the settlement operation image.

In some embodiments, the acquisition module includes: an image acquisition trigger unit, configured to trigger an image acquisition apparatus to continuously perform image acquisition on a settlement region; and a detection processing unit, configured to perform detection processing on an operation image acquired each time, wherein the detection processing unit comprises: a first detection unit, configured to detect whether there is the biometric feature information in the settlement operation image; and a first comparison unit, configured to compare the biometric feature information with existing information in the buffer space if there is the biometric feature information in the settlement operation image; and a replacement unit, configured to replace the existing information with the biometric feature information if the biometric feature information does not match the existing information.

In some embodiments, the payment processing apparatus further includes: an information display module, configured to display prompt information to the settlement user during the storage of the biometric feature information in the buffer space, wherein the prompt information is used for prompting acquired biometric feature information.

In some embodiments, the determining module includes: a second detection unit, configured to detect whether the biometric feature information is stored in the buffer space; and a first determining unit, configured to: when the biometric feature information is stored in the buffer space, determine that the biometric feature information is successfully acquired.

In some embodiments, the payment processing apparatus further includes: a first interface display module, configured to display a payment confirmation interface to the settlement user; and an account obtaining module, configured to: when payment confirmation information inputted by the settlement user is received, obtain the payment account of the settlement user according to the biometric feature information.

In some embodiments, the account obtaining module includes: a second comparison unit, configured to compare to-be-compared information with more than one piece of pre-stored sample information, to obtain sample information matching the to-be-compared information, wherein the to-be-compared information comprises the biometric feature information; and a second determining unit, configured to determine a payment account associated with the sample information as the payment account of the settlement user.

In some embodiments, the to-be-compared information includes verification information, and the payment processing apparatus further includes: a second interface display module, configured to display a verification information input interface to the settlement user; and the second comparison unit is configured to: when the verification information inputted by the settlement user is received, compare the to-be-compared information with the more than one piece of pre-stored sample information.

In some embodiments, the payment processing apparatus further includes: a second interface display module, configured to display a payment mode selection interface to the settlement user if the biometric feature information fails to be acquired; and a second obtaining module, configured to: when the payment mode selected by the settlement user is received, obtain the payment account of the settlement user according to a payment mode selected by the settlement user.

Figure 11:
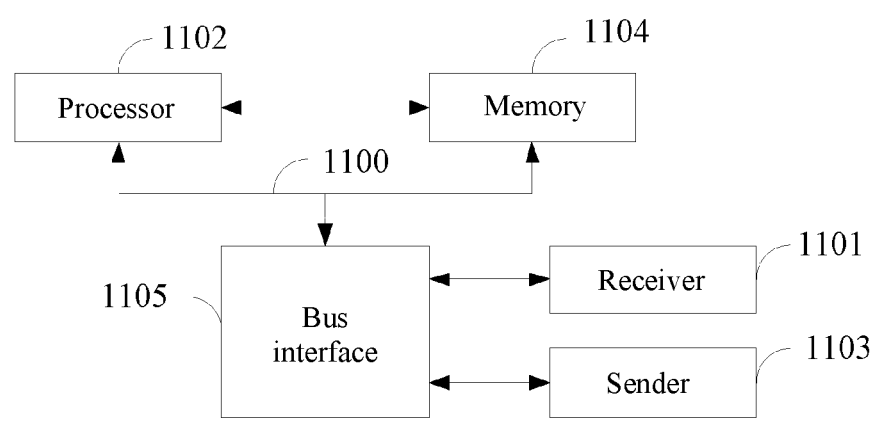
FIG. 11 is a schematic diagram of a circuit structure of a self-service checkout device, according to an embodiment of this specification.

According to a third aspect, an embodiment of this application further provides a self-service checkout device based on the same inventive concept. A diagram of a circuit structure of the self-service checkout device is shown in FIG. 11. The self-service checkout device includes a memory 1104, a processor 1102, and a computer program that is stored in the memory 1104 and runnable on the processor 1102. The processor 1102, when executing the program, performs the steps of the payment processing method described above.

In FIG. 11, in a bus architecture (represented by a bus 1100), the bus 1100 may include any quantity of interconnected buses and bridges, and the bus 1100 connects various circuits including one or more processors represented by a processor 1102 and memories represented by a memory 1104. The bus 1100 may further connect various other circuits such as a peripheral device, a voltage stabilizer, and a power management circuit. These are known in the art, and therefore are not further described in this specification. A bus interface 1105 provides an interface between the bus 1100 and a receiver 1101 and/or a sender 1103. The receiver 1101 and the sender 1103 may be a same element, that is, a transceiver, providing a unit configured to communicate with various other apparatuses on a transmission medium. The processor 1102 is responsible for management of the bus 1100 and normal processing, and the memory 1104 may be configured to store data used when the processor 1102 performs an operation.

According to a fourth aspect, based on the same inventive concept of the payment processing method in the foregoing embodiment, this specification further provides a computer-readable storage medium storing a computer program. The program, when executed by a processor, performs the steps of the payment processing method described above.

This specification is described with reference to the flowchart and/or block diagram of the method, device (system), and computer program product of the embodiments of this specification. Computer program instructions may be used to implement each procedure and/or block in the flowcharts and/or block diagrams and a combination of procedures and/or blocks in the flowcharts and/or block diagrams. The computer program instructions may be provided for a general-purpose computer, a special-purpose computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

The computer program instructions may be stored in a computer-readable memory that can instruct the computer or any other programmable data processing device to work in a specific manner, so that the instructions stored in the computer-readable memory generate an artifact that includes an instruction device. The instruction device implements a specific function in one or more processes in the flowcharts and/or in one or more blocks in the block diagrams.

The computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although preferred embodiments of this specification have been described, once a person skilled in the art learns of the basic creative concept, additional changes and modifications may be made to the embodiments. Therefore, the following claims are intended to be construed as to cover the exemplary embodiments and all changes and modifications falling within the scope of this specification.

Apparently, a person skilled in the art may make various modifications and variations to this specification without departing from the spirit and scope of this specification. In this way, if the modifications and variations of this specification fall within the scope of the claims of this specification and equivalent technologies thereof, this specification also intends to include the changes and variations.

What is claimed is:

1. A computer-implemented method, comprising:
receiving, by a computer device, a product settlement request from a settlement user;
acquiring and storing, by the computer device, biometric feature information of the settlement user, wherein the acquiring the biometric feature information of the settlement user comprises:
triggering, by the computer device, a camera to acquire an image on a settlement venue;
in response to the image comprising a plurality of users, determining, by the computer device, respective distances from the plurality of users in the image to the computer device using image processing techniques based on a sensor size of the camera;
determining, by the computer device, one of the plurality of users in the image with a shortest distance to the computer device as the settlement user;
extracting, by the computer device, the biometric feature information of the settlement user from the image and storing the biometric feature information;

receiving, by the computer device, a payment request and product information from the settlement user;

in response to receiving the payment request, obtaining, by the computer device, a payment account of the settlement user according to the stored biometric feature information; and deducting, by the computer device from the payment account, a consumption amount determined based on the product information.

2. The method of claim 1, wherein the method further comprises:

triggering the camera to perform image acquisition on the settlement venue through a plurality of points in time, wherein the plurality of points in time are after receiving the product settlement request and before receiving the payment request;

for each image collected at one of the plurality of points in time, extracting observed biometric feature information in the each image, and comparing the observed biometric feature information with the stored biometric feature information; and replacing the stored biometric feature information with the observed biometric feature information if the observed biometric feature information does not match the stored biometric feature information.

3. The method of claim 1, further comprising:

displaying, by the computer device, prompt information to the settlement user, wherein the prompt information displays the stored biometric feature information.

4. The method of claim 1, wherein before the obtaining a payment account of the settlement user according to the stored biometric feature information, the method further comprises:

displaying a payment confirmation interface to the settlement user;

receiving payment confirmation information from the payment confirmation interface that confirms that the stored biometric feature information is used for making a payment; and in response to confirming that the stored biometric feature information is used for making the payment, obtaining the payment account of the settlement user according to the stored biometric feature information.

5. The method of claim 1, wherein the obtaining a payment account of the settlement user according to the stored biometric feature information comprises:

comparing the stored biometric feature information with a plurality of pre-stored biometric samples;

identifying one of the plurality of pre-stored biometric samples that matches the stored biometric feature information; and determining a payment account associated with the identified biometric sample as the payment account of the settlement user.

6. The method of claim 5, wherein the stored biometric feature information further comprises first verification information, and before the comparing stored biometric feature information with the plurality of pre-stored biometric samples, the method further comprises:

displaying a verification information input interface to the settlement user;

receiving second verification information from the verification information input interface;

comparing the first verification information with the second verification information; and when the first and second verification information are matched, comparing the stored biometric feature information with the plurality of pre-stored biometric samples.

7. The method of claim 1, wherein the acquiring the biometric feature information of the settlement user further comprises, if the respective distances from the plurality of users in the image to the computer device are the same:

detecting respective positions of the plurality of users in the settlement venue;

determining one of the plurality of users in a middle position in the settlement venue as the settlement user; and extracting biometric feature information of the settlement user from the image and storing the biometric feature information.

8. One or more non-transitory computer-readable storage media storing instructions executable by one or more processors, wherein execution of the instructions causes the one or more processors to perform operations comprising:

receiving a product settlement request from a settlement user;

acquiring and storing biometric feature information of the settlement user, wherein the acquiring the biometric feature information of the settlement user comprises:

triggering a camera to acquire an image on a settlement venue;

in response to the image comprising a plurality of users, determining respective distances from the plurality of users in the image to a computer device associated with the storage media using image processing techniques based on a sensor size of the camera;

determining one of the plurality of users in the image with a shortest distance to the computer device as the settlement user;

extracting the biometric feature information of the settlement user from the image and storing the biometric feature information;

receiving a payment request and product information from the settlement user;

in response to receiving the payment request, obtaining a payment account of the settlement user according to the stored biometric feature information; and deducting, from the payment account, a consumption amount determined based on the product information.

9. The non-transitory computer-readable storage media of claim 8, wherein the operations further comprise:

triggering the camera to perform image acquisition on the settlement venue through a plurality of points in time, wherein the plurality of points in time are after receiving the product settlement request and before receiving the payment request;

for each image collected at one of the plurality of points in time, extracting observed biometric feature information in the each image, and comparing the observed biometric feature information with the stored biometric feature information; and replacing the stored biometric feature information with the observed biometric feature information if the observed biometric feature information does not match the stored biometric feature information.

10. The non-transitory computer-readable storage media of claim 8, wherein the operations further comprise:

displaying prompt information to the settlement user, wherein the prompt information displays the stored biometric feature information.

11. The non-transitory computer-readable storage media of claim 8, wherein before the obtaining a payment account of the settlement user according to the stored biometric feature information, the operations further comprise:
displaying a payment confirmation interface to the settlement user;
receiving payment confirmation information from the payment confirmation interface that confirms that the stored biometric feature information is used for making a payment; and
in response to confirming that the stored biometric feature information is used for making the payment, obtaining a payment account of the settlement user according to the stored biometric feature information.

12. The non-transitory computer-readable storage media of claim 8, wherein the obtaining a payment account of the settlement user according to the stored biometric feature information comprises:
comparing the stored biometric feature information with a plurality of pre-stored biometric samples;
identifying one of the plurality of pre-stored biometric samples that matches the stored biometric feature information; and
determining a payment account associated with the identified biometric sample as the payment account of the settlement user.

13. The non-transitory computer-readable storage media of claim 12, wherein the stored biometric feature information further comprises first verification information, and before the comparing stored biometric feature information with the plurality of pre-stored biometric samples, the operations further comprise:
displaying a verification information input interface to the settlement user;
receiving second verification information from the verification information input interface;
comparing the first verification information with the second verification information; and
when the first and second verification information are matched, comparing the stored biometric feature information with the plurality of pre-stored biometric samples.

14. The non-transitory computer-readable storage media of claim 8, wherein the acquiring the biometric feature information of the settlement user further comprises, if the respective distances from the plurality of users in the image to the computer device are the same:
detecting respective positions of the plurality of users in the settlement venue;
determining one of the plurality of users in a middle position in the settlement venue as the settlement user; and
extracting biometric feature information of the settlement user from the image and storing the biometric feature information.

15. A system comprising one or more processors and one or more non-transitory computer-readable memories coupled to the one or more processors and configured with instructions executable by the one or more processors to cause the system to perform operations comprising:
receiving a product settlement request from a settlement user;
acquiring and storing biometric feature information of the settlement user, wherein the acquiring the biometric feature information of the settlement user comprises:
triggering a camera to acquire an image on a settlement venue;
in response to the image comprising a plurality of users, determining respective distances from the plurality of users in the image to a computer device associated with the system using image processing techniques based on a sensor size of the camera;
determining one of the plurality of users in the image with a shortest distance to the computer device as the settlement user;
extracting the biometric feature information of the settlement user from the image and storing the biometric feature information;
receiving a payment request and product information from the settlement user;
in response to receiving the payment request, obtaining a payment account of the settlement user according to the stored biometric feature information; and
deducting, from the payment account, a consumption amount determined based on the product information.

16. The system of claim 15, wherein the operations further comprise:
triggering the camera to perform image acquisition on the settlement venue through a plurality of points in time, wherein the plurality of points in time are after receiving the product settlement request and before receiving the payment request;
for each image collected at one of the plurality of points in time,
extracting observed biometric feature information in the each image, and
comparing the observed biometric feature information with the stored biometric feature information; and
replacing the stored biometric feature information with the observed biometric feature information if the observed biometric feature information does not match the stored biometric feature information.

17. The system of claim 15, wherein before the obtaining a payment account of the settlement user according to the stored biometric feature information, the operations further comprise:
displaying a payment confirmation interface to the settlement user;
receiving payment confirmation information from the payment confirmation interface that confirms that the stored biometric feature information is used for making a payment; and
in response to confirming that the stored biometric feature information is used for making the payment, obtaining a payment account of the settlement user according to the stored biometric feature information.

18. The system of claim 15, wherein the obtaining a payment account of the settlement user according to the stored biometric feature information comprises:
comparing the stored biometric feature information with a plurality of pre-stored biometric samples;
identifying one of the plurality of pre-stored biometric samples that matches the stored biometric feature information; and
determining a payment account associated with the identified biometric sample as the payment account of the settlement user.

19. The system of claim 18, wherein the biometric feature information further comprises first verification information, and before the comparing stored biometric feature information with the plurality of pre-stored biometric samples, the operations further comprise:
displaying a verification information input interface to the settlement user;

receiving second verification information from the verification information input interface;

comparing the first verification information with the second verification information; and when the first and second verification information are matched, comparing the stored biometric feature information with the plurality of pre-stored biometric samples.

20. The system of claim 15, wherein the acquiring the biometric feature information of the settlement user further comprises, if the respective distances from the plurality of users in the image to the computer device are the same:

detecting respective positions of the plurality of users in the settlement venue;

determining one of the plurality of users in a middle position in the settlement venue as the settlement user; and extracting biometric feature information of the settlement user from the image and storing the biometric feature information.

* * * * *